(12) United States Patent
Todd

(10) Patent No.: US 8,720,556 B2
(45) Date of Patent: May 13, 2014

(54) METHODS FOR INITIATING NEW FRACTURES IN A COMPLETED WELLBORE HAVING EXISTING FRACTURES PRESENT

(75) Inventor: Bradley L. Todd, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 281 days.

(21) Appl. No.: 13/307,790

(22) Filed: Nov. 30, 2011

(65) Prior Publication Data

US 2013/0133887 A1    May 30, 2013

(51) Int. Cl.
*E21B 33/138* (2006.01)
*E21B 43/26* (2006.01)
*E21B 43/267* (2006.01)

(52) U.S. Cl.
USPC ........ 166/281; 166/280.1; 166/292; 166/294; 166/295; 166/300

(58) Field of Classification Search
None
See application file for complete search history.

(56) References Cited

U.S. PATENT DOCUMENTS

| | | | |
|---|---|---|---|
| 2,838,116 A | 10/1956 | Clark et al. | |
| 4,107,057 A | 8/1978 | Dill et al. | |
| 5,680,900 A | 10/1997 | Nguyen et al. | |
| 7,066,265 B2 * | 6/2006 | Surjaatmadja | 166/308.1 |
| 7,185,703 B2 * | 3/2007 | Jannise et al. | 166/308.1 |
| 7,565,929 B2 * | 7/2009 | Bustos et al. | 166/279 |
| 2004/0261996 A1 | 12/2004 | Munoz et al. | |
| 2006/0113077 A1 | 6/2006 | Willberg et al. | |
| 2007/0281870 A1 | 12/2007 | Robb et al. | |
| 2008/0000639 A1 * | 1/2008 | Clark et al. | 166/281 |
| 2008/0093073 A1 | 4/2008 | Bustos et al. | |
| 2008/0200352 A1 | 8/2008 | Willberg et al. | |
| 2008/0217011 A1 | 9/2008 | Pauls et al. | |
| 2011/0005761 A1 * | 1/2011 | Luo et al. | 166/308.2 |

FOREIGN PATENT DOCUMENTS

WO    2013081727 A1    6/2013

OTHER PUBLICATIONS

International Search Report and Written Opinion for PCT/US2013/027863 dated Apr. 17, 2013.
International Search Report and Written Opinion for PCT/US2012/59277 dated Jan. 21, 2013.

* cited by examiner

*Primary Examiner* — George Suchfield
(74) *Attorney, Agent, or Firm* — McDermott Will & Emery LLP; Craig W. Roddy

(57) ABSTRACT

Fracturing operations can be problematic in completed wellbores containing at least one existing fracture, since it can be difficult to seal an existing fracture and initiate a new fracture within a reasonable timeframe due to the presence of particulate materials in the wellbore. Methods for fracturing a completed wellbore can comprise introducing a treatment fluid comprising a plurality of degradable sealing particulates into a completed wellbore penetrating a subterranean formation having an existing fracture therein; sealing the existing fracture with at least a portion of the degradable sealing particulates, thereby forming a degradable particulate seal; after sealing, allowing any degradable sealing particulates remaining in the treatment fluid to degrade, such that the treatment fluid becomes substantially particulate free; and after the treatment fluid becomes substantially particulate free, fracturing the subterranean formation so as to introduce at least one new fracture therein.

21 Claims, 2 Drawing Sheets

METHODS FOR INITIATING NEW FRACTURES IN A COMPLETED WELLBORE HAVING EXISTING FRACTURES PRESENT

BACKGROUND

The present invention generally relates to fracturing operations, and, more specifically, to sealing existing fractures in a completed wellbore, followed by initiating new fractures therein.

Fracturing operations are often conducted in order to increase production from a subterranean formation. During the course of production from a subterranean operation, it can sometimes become necessary to perform subsequent fracturing operations on the subterranean formation, for example, if the initial fracturing operation failed to introduce sufficient fractures needed to achieve a desired level of production. These subsequent fracturing operations can become much more of a technical challenge due to the presence of the existing fractures in the wellbore. In order to prevent fluid leak off into the subterranean formation during subsequent fracturing operations, it can be necessary to seal the existing fractures in the subterranean formation. Typically, the sealing of existing fractures in the subterranean formation can be conducted with a particulate slurry that deposits a particulate seal within the fractures. The particulate seal can be formulated to degrade at a later time, if desired.

Excess particulate slurry is typically introduced into the subterranean formation, since it can be difficult to precisely determine the volume needed to seal the existing fractures. The presence of the excess particulate slurry in the subterranean formation can inhibit the ability to perform subsequent fracturing operations. Specifically, the presence of a particulate slurry in the subterranean formation can result in a lack of pressure communication from the fluid to the surface of the subterranean formation. That is, the presence of particulates in a subterranean formation can prevent fracturing from occurring, even when a fracturing fluid is introduced into the subterranean formation at a pressure that is typically sufficient to create or enhance at least one fracture therein.

When performing subsequent fracturing operations in a subterranean formation, the particulates used for sealing the existing fractures can sometimes simply be flushed from the subterranean formation prior to fracturing. Although there is no reliable way to conclusively determine that the fluid within the formation is substantially particulate free and suitable for conducting a subsequent fracturing operation, this approach can typically be sufficient for uncompleted wellbores, since adequate fluid circulation can typically be achieved to remove the particulates from the subterranean formation. However, flushing can considerably add to the time and expense of production from the subterranean formation.

For completed wellbores, the issue of eliminating particulates from the subterranean formation can become considerably more problematic. In the case of completed wellbores, where the existing fractures are behind a fracturing sleeve or like barrier, it can be difficult to generate adequate fluid circulation, even with large flushing volumes, to effectively flush the particulates from the wellbore space. The failure to completely remove residual particulates from the wellbore can cause subsequent fracturing operations to fail.

SUMMARY OF THE INVENTION

The present invention generally relates to fracturing operations, and, more specifically, to sealing existing fractures in a completed wellbore, followed by initiating new fractures therein.

In one embodiment, the present invention provides a method comprising: introducing a treatment fluid comprising a plurality of degradable sealing particulates into a completed wellbore penetrating a subterranean formation having an existing fracture therein; sealing the existing fracture with at least a portion of the degradable sealing particulates, thereby forming a degradable particulate seal; after sealing, allowing any degradable sealing particulates remaining in the treatment fluid to degrade, such that the treatment fluid becomes substantially particulate free; and after the treatment fluid becomes substantially particulate free, fracturing the subterranean formation so as to introduce at least one new fracture therein.

In one embodiment, the present invention provides a method comprising: providing a treatment fluid comprising a plurality of degradable sealing particulates and an additive that accelerates the degradation rate of the degradable sealing particulates; introducing the treatment fluid into a completed wellbore penetrating a subterranean formation having an existing fracture therein, such that the existing fracture is sealed with at least a portion of the degradable sealing particulates to form a degradable particulate seal; allowing sufficient time to pass for any degradable sealing particulates remaining in the treatment fluid to degrade, such that the treatment fluid becomes substantially particulate free; and after the treatment fluid becomes substantially particulate free, fracturing the subterranean formation so as to introduce at least one new fracture therein.

In one embodiment, the present invention provides a method comprising: providing a treatment fluid comprising a plurality of degradable sealing particulates; introducing the treatment fluid into a completed wellbore penetrating a subterranean formation having a first plurality of fractures therein, such that the first plurality of fractures are penetrated with at least a portion of the degradable sealing particulates to form a degradable particulate seal therein; wherein the completed wellbore comprises an annulus defined by a fracturing sleeve and a surface of the subterranean formation; allowing sufficient time to pass for any degradable sealing particulates remaining in the treatment fluid to degrade, such that the treatment fluid becomes substantially particulate free; after the treatment fluid becomes substantially particulate free, fracturing the subterranean formation so as to introduce a second plurality of fractures therein; and after fracturing, allowing the degradable particulate seal to degrade.

The features and advantages of the present invention will be readily apparent to one skilled in the art upon a reading of the description of the preferred embodiments that follows.

DETAILED DESCRIPTION

Figure 1A:
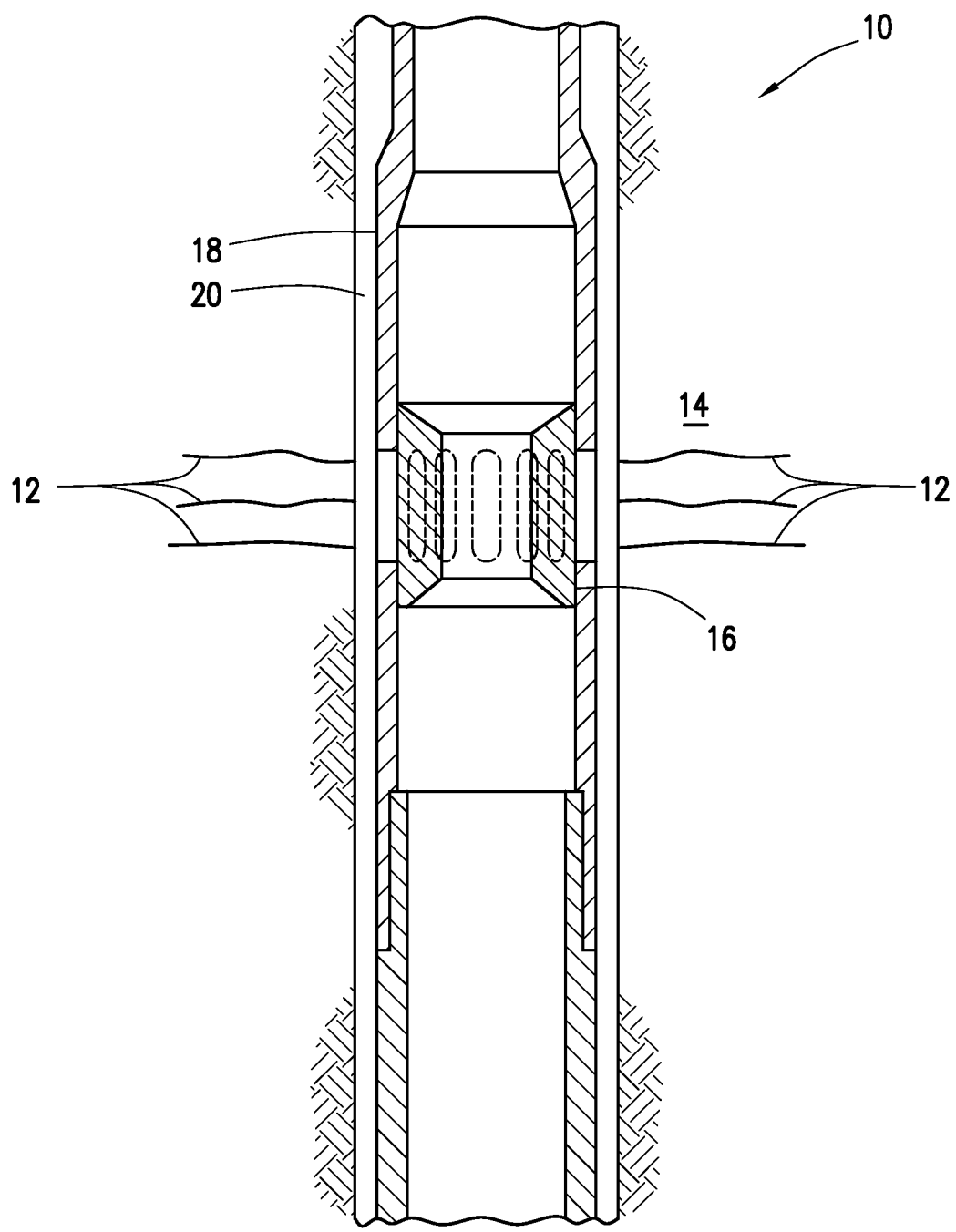
FIGS. 1A and 1B show illustrative schematics of a completed wellbore containing fractures within a subterranean formation, where the fractures are located behind a fracturing sleeve.

The present invention generally relates to fracturing operations, and, more specifically, to sealing existing fractures in a completed wellbore, followed by initiating new fractures therein.

The embodiments described herein can advantageously allow multiple fracturing operations to take place in a subterranean formation in order to increase production therefrom. Specifically, the methods described herein provide a mechanism by which existing fractures in a subterranean formation can be closed with a particulate seal while performing a new fracturing operation, but without the particulates jeopardizing the capacity for forming new fractures in the subterranean formation. A key benefit of the present methods is that they can considerably shorten the wait time needed for performing subsequent fracturing operations in a subterranean formation. As a result, the present methods can lead to faster and lower cost production. An even greater advantage of the present methods is that they can be effectively used in completed wellbores, where it can otherwise be difficult to remove particulates before attempting a subsequent fracturing operation. Although the present methods can be particularly useful for completed wellbores, they can also increase production efficiency and reduce production costs in a like manner for uncompleted wellbores as well.

The embodiments described herein utilize degradable sealing particulates, specifically a degradable particulate slurry, which can be in the form of a treatment fluid. When introduced into a subterranean formation, the degradable sealing particulates can form a degradable particulate seal in the existing fractures of the formation. Although a wide variety of degradable sealing particulates have been used in subterranean operations for sealing fractures, they have typically been used in applications where no subsequent operations are needed and the particulates can be left to degrade at their native degradation rate. In other cases, the residual particulates can be flushed from the subterranean formation. As noted above, this approach can be ineffective for completed wellbores.

In contrast to conventional uses of degradable sealing particulates, according to the present embodiments, remaining degradable sealing particulates in the treatment fluid can be allowed to degrade or their degradation can be accelerated such that the treatment fluid becomes substantially particulate free and capable of effectively communicating fracturing pressure. The present inventor has recognized that degradable sealing particulates in a treatment fluid can degrade at a significantly faster rate than when degradable sealing particulates are present in a degradable particulate seal. Specifically, the present inventor has recognized that when degradable sealing particulates are disposed within a degradable particulate seal, the chemical and physical environment to which the degradable sealing particulates are exposed can be considerably different than that present within a treatment fluid. These differences can be exploited to create a treatment fluid that temporarily contains particulates for forming a degradable particulate seal, but later becomes substantially particulate free such that additional fracturing operations can be conducted while the degradable particulate seal remains intact. Due to the slower degradation rate of the degradable particulates in the degradable particulate seal, the existing fractures can be at least temporarily plugged while the subsequent fracturing operations take place.

As noted above, the presently described methods utilize degradable sealing particulates in a manner that is considerably different than they have been conventionally employed in the art. Allowing the degradable sealing particulates in the treatment fluid to degrade, potentially at an accelerated rate, can considerably shorten the wait time and expense needed for conducting subsequent fracturing operations compared to the conventional uses of degradable particulates. Specifically, according to some of the present embodiments, an additive can be included in the treatment fluid to accelerate the degradation rate of the degradable sealing particulates therein, but more so than the degradable sealing particulates in the degradable particulate seal. This is contrary to conventional uses of degradable sealing particulates, where it would generally not be desirable to increase the degradation rate of a degradable particulate seal over its native degradation rate. Furthermore, the morphology and chemistry of the degradable sealing particulates can be tailored to change their degradation rate in the treatment fluid and/or in the degradable particulate seal in order to suit a particular application.

As used herein, the terms "treatment" or "treating" refer to any subterranean operation that uses a fluid in conjunction with achieving a desired function and/or for a desired purpose. The terms "treatment" and "treating," as used herein, do not imply any particular action by the fluid or any particular component thereof, unless otherwise specified. As used herein, a "treatment fluid" is a fluid that is placed in a subterranean formation in order to perform a desired function. Treatment fluids can include, for example, drilling fluids, fracturing fluids, gravel packing fluids, acidizing fluids, conformance treatment fluids, damage control fluids, remediation fluids, scale removal and inhibition fluids, chemical floods, and the like.

As used herein, the term "degradable sealing particulates" refers to a particulate material that degrades to a non-particulate material over a period of time. The degradation of the degradable sealing particulates can involve a chemical degradation, in some embodiments, such that the degradable sealing particulates are chemically changed in the course of becoming non-particulate. For example, the degradable sealing particulates can be chemically changed from a material that is substantially insoluble in water to a material that is water soluble. In some embodiments, the degradation of the degradable sealing particulates can involve a physical change. For example, in some embodiments, the sealing particulates can simply become soluble over a period of time or undergo a physical change that renders them non-particulate. Enzymatic (biological) transformations can also be used to degrade the degradable sealing particulates. Combinations of physical, chemical and/or biological changes can also take place to degrade the particulate character of the degradable sealing particulates. Unless otherwise specified, the term "degradable" is not meant to imply any particular mode of degradation or a particular degradation rate.

As used herein, the term "degradable particulate seal" refers to an agglomerated collection of degradable sealing particulates that are not disposed within a treatment fluid. Unless otherwise specified, the degradable sealing particulates in a degradable particulate seal can degrade at a slower rate than like degradable sealing particulates that are present in a treatment fluid.

As used herein, the term "substantially particulate free" refers to a condition in which a treatment fluid does not contain particulates at a level that interferes with the capability to communicate fracturing pressure to the surface of a subterranean formation. In some embodiments, a treatment fluid that contains less than about 5% degradable sealing particulates by volume can be considered to be substantially particulate free. In other embodiments, a treatment fluid which contains less than about 1% degradable sealing particulates by volume can be considered to be substantially particulate free.

In some embodiments, methods described herein can comprise: introducing a treatment fluid comprising a plurality of degradable sealing particulates into a completed wellbore penetrating a subterranean formation having an existing fracture therein; sealing the existing fracture with at least a portion of the degradable sealing particulates, thereby forming a degradable particulate seal; after sealing, allowing any degradable sealing particulates remaining in the treatment fluid to degrade, such that the treatment fluid becomes substantially particulate free, and after the treatment fluid becomes substantially particulate free, fracturing the subterranean formation so as to introduce at least one new fracture therein.

In some embodiments, methods described herein can comprise: providing a treatment fluid comprising a plurality of degradable sealing particulates and an additive that accelerates the degradation rate of the degradable sealing particulates; introducing the treatment fluid into a completed wellbore penetrating a subterranean formation having an existing fracture therein, such that the existing fracture is sealed with at least a portion of the degradable sealing particulates to form a degradable particulate seal; allowing sufficient time to pass for any degradable sealing particulates remaining in the treatment fluid to degrade, such that the treatment fluid becomes substantially particulate free; and after the treatment fluid becomes substantially particulate free, fracturing the subterranean formation so as to introduce at least one new fracture therein.

In some embodiments, methods described herein can comprise: providing a treatment fluid comprising a plurality of degradable sealing particulates; introducing the treatment fluid into a completed wellbore penetrating a subterranean formation having an existing fracture therein, such that the existing fracture is sealed with at least a portion of the degradable sealing particulates to form a degradable particulate seal, wherein the completed wellbore comprises an annulus defined by a fracturing sleeve and a surface of the subterranean formation; allowing sufficient time to pass for any degradable sealing particulates remaining in the treatment fluid to degrade, such that the treatment fluid becomes substantially particulate free; and after the treatment fluid becomes substantially particulate free, fracturing the subterranean formation so as to introduce at least one new fracture therein.

After forming a degradable particulate seal in the subterranean formation and allowing the treatment fluid to become substantially particulate free, a fracturing operation can be conducted in the subterranean formation so as to generate at least one new fracture therein. Subsequently, the new fractures can be temporarily sealed, if desired, according to the methods described herein, and yet another fracturing operation can be conducted in the subterranean formation. That is, the present methods can be employed to fracture a subterranean formation multiple times, if desired. Otherwise, once the fracturing operation is complete, production can be allowed to occur in some embodiments.

In some embodiments, the present methods can further comprise producing a fluid from the subterranean formation. In some embodiments, the produced fluid can be a formation fluid such as, for example, oil or natural gas that is produced after the fracturing operation takes place.

In some embodiments, the present methods can further comprise allowing the degradable particulate seal to degrade after fracturing takes place. The only general requirements for the degradable particulate seal is that it remains intact for a sufficient length of time for the fracturing operation to take place and that it degrades at a slower rate than the residual degradable sealing particulates in the treatment fluid. After the fracturing operation occurs, production can then take place. In some embodiments, the degradable particulate seal can be allowed to degrade before production takes place. In such embodiments, production can occur from both the new and existing fractures. In other embodiments, the degradable particulate seal can be allowed to degrade while production takes place. In such embodiments, production can begin from the new fractures and subsequently be supplemented by production from the existing fractures as they are opened, if the existing fractures are still capable of production. In still other embodiments, the degradable particulate seal can be sufficiently stable such that it remains substantially intact while production occurs. In such embodiments, production can occur from only the new fractures while the existing fractures remain sealed.

In general, the degradable sealing particulates in the treatment fluid and the degradable sealing particulates in the degradable particulate seal can degrade at significantly different rates, such that the degradable particulate seal can remain intact, while the degradable sealing particulates within the treatment fluid can degrade to produce a substantially particulate free treatment fluid. In some embodiments, the varying degradation rates of the degradable sealing particulates in the treatment fluid and in the degradable particulate seal can be due to inherent chemical or physical differences encountered in each location. In other embodiments, the treatment fluid can contain an additive that accelerates the degradation rate of the degradable sealing particulates therein but not those in the degradable particulate seal. Specifically, the degradable sealing particulates in the degradable particulate seal can fail to be exposed to the additive or be exposed to insufficient quantities of the additive to appreciably affect their degradation rate, thereby making the degradation rate of the degradable particulate seal much lower. For example, when the degradable sealing particulates are agglomerated as a degradable particulate seal, their effective concentration can be higher than that in the treatment fluid, such that the additive concentration is insufficient to appreciably affect their degradation rate. In some cases, the lower degradation rate of the degradable particulate seal can be due to a reduced contact surface area for the degradable sealing particulates in the degradable particulate seal.

It is not necessary that the degradable sealing particulates in the treatment fluid and the degradable sealing particulates in the degradable particulate seal degrade in the same manner, if the degradable particulate seal even degrades at all. In some embodiments, an additive in the treatment fluid can be used to accelerate the degradation rate of the degradable sealing particulates in the treatment fluid, whereas the degradable sealing particulates in the degradable particulate seal can be allowed to degrade at their native degradation rate, since they are exposed to a lower effective concentration of the additive. In one embodiment, the degradable sealing particulates in the treatment fluid can be degraded with an additive such as, for example, an acid, and the degradable sealing particulates in the degradable particulate seal can be allowed to degrade at their native degradation rate upon extended exposure to formation conditions (e.g., formation heat or a formation component). Suitable degradable sealing particulates and additives are set forth in greater detail hereinbelow. In some embodiments, the additive can be part of the degradable sealing particulates.

The only basic requirements for the degradable sealing particulates in the treatment fluid is that at least a portion of the degradable sealing particulates remain non-degraded during the downhole transit time and that sufficient non-degraded degradable sealing particulates are present to seal an existing fracture in the subterranean formation. That is, a sufficient quantity of the degradable sealing particulates must remain non-degraded during the time that they are pumped downhole such that they can effectively seal an existing fracture. In practice, the degradable sealing particulates in the treatment fluid can persist for a length of time after being pumped downhole and the degradable particulate seal forms. One of ordinary skill in the art will understand the factors that influence the degradation rate of degradable sealing particulates in a treatment fluid and be able to formulate a treatment fluid containing suitable degradable sealing particulates and an optional additive that accelerates the degradation rate in order to achieve a chosen downhole transit time. Furthermore, once the treatment fluid is downhole, one of ordinary skill in the art will understand the period of time that needs to pass before a particular treatment fluid can be expected to become substantially particulate free. Specifically, by knowing the downhole temperature, downhole transit time and/or other downhole conditions (e.g., formation chemistry), one of ordinary skill in the art will be able to determine the period of time needed for the present treatment fluids to become substantially particulate free when they contain a given type of degradable sealing particulates.

In some embodiments, it can be desirable to accelerate the degradation rate of the degradable particulate seal once a fracturing operation has been conducted. In some embodiments, an additive can be introduced into the subterranean formation in order to accelerate the degradation rate of the degradable particulate seal. If used, the additive to accelerate the degradation rate of the degradable particulate seal can be the same or different than the additive used to accelerate the degradation rate of the degradable sealing particulates in the treatment fluid. In embodiments in which the additive is the same, the amount of additive used to promote the degradation of the degradable particulate seal can be greater than that used to accelerate the degradation rate of the degradable sealing particulates in the treatment fluid. For example, a first concentration of the additive can be used in the treatment fluid to accelerate the degradation rate of the degradable sealing particulates therein, and a second concentration of the additive can be used to accelerate the degradation rate of the degradable particulate seal. In some embodiments, the additive can be part of the degradable sealing particulates. In some embodiments, the additive can be present only in the treatment fluid. In some embodiments, the additive can be present both in the degradable sealing particulates and in the treatment fluid.

Suitable degradable sealing particulates can include, for example, organic salts (e.g., fatty acid salts, tetraalkylammonium compounds and the like), inorganic salts (e.g., $CaCO_3$, MgO, CaO and the like), degradable polymers, water-soluble polymers, dehydrated borates, polylactic acid, polylactides, polyacrylamide, polyacrylates, polyvinyl alcohol, poly (orthoesters), polyethers, polyesters, polyester amides, polyether amides, polyethylene oxides, polyamides, polyacetals, polyketones, polycarbonates, polyanhydrides, polyurethanes, polyester urethanes, polycarbonate urethanes, polycaprolactone urethanes, waxes, hydrogenated soybean oil, polysilicones, polysaccharides, acetylated polysaccharides, propylated polysaccharides, xanthan, ethylcellulose, methylcellulose, acetylated guar, starches, derivatized starches, chitosan, chitan, polyhydroxy alcohols, acid-soluble compounds, base-soluble compounds, oil-soluble compounds, oxidatively degraded compounds, enzymatically degraded compounds, slowly soluble compounds, slowly soluble polymers, shellac, and various combinations thereof. Combinations of these materials and others can be used to tailor the degradation rate of the degradable sealing particulates to a particular application. The degradable sealing particulates are not particularly limited in size or shape, which can include various non-limiting forms such as, for example, platelets, shavings, flakes, ribbons, rods, strips, spheroids, toroids, pellets, tablets, needles, powders and/or the like. These particulate forms can have a varying amount of surface area (e.g., due to particulate size), which can be used to influence the degradation rate. In some embodiments, a first degradable material can be combined with a second degradable material to form a degradable sealing particulate. The first degradable material and the second degradable material can degrade by the same or different mechanism. For example, degradable sealing particulates comprising a combination of a polyacrylamide and polyvinyl alcohol can be used in some of the present embodiments. In such embodiments, a crosslinked polyacrylamide gel can be combined with polyvinyl alcohol particulates, where the crosslinked polyacrylamide can degrade in the presence of a base, oxidant, and/or heat, and the polyvinyl alcohol particulates can become slowly soluble in water as the polyacrylamide is removed at the formation temperature. In such embodiments, the crosslinked polyacrylamide can serve as a soft gel and polyvinyl alcohol particulates can serve as a hard core, where the hybrid material of the two components can temporarily seal a fracture.

Degradable polymers suitable for use in the present embodiments can include, for example, polysaccharides (e.g., dextran, cellulose, guar, and derivatives thereof), chitin, chitosan, proteins, aliphatic polyesters [e.g., poly(hydroxy alkanoates)], polyglycolic acid and other poly(glycolides), polylactic acid and other poly(lactides), polyacrylamide and other polyacrylates, polymethacrylamide and other polymethacrylates, polyvinyl alcohol, poly($\beta$-hydroxy alkanoates) [e.g., poly($\beta$-hydroxy butyrate) and poly($\beta$-hydroxybutyrates-co-$\beta$-hydroxyvalerate)], poly(hydroxybutyrates), poly(O)-hydroxy alkanoates) [e.g., poly($\beta$-propiolactone) and poly($\epsilon$-caprolactone], poly(alkylene dicarboxylates) [e.g., poly(ethylene succinate) and poly(butylene succinate)], poly(hydroxy ester ethers), poly(anhydrides) [e.g., poly(adipic anhydride), poly(suberic anhydride), poly(sebacic anhydride), poly(dodecanedioic anhydride), poly(maleic anhydride) and poly(benzoic anhydride)], polycarbonates (e.g., trimethylenecarbonate), poly(orthoesters), poly(amino acids), poly(ethylene oxides), poly(etheresters), polyester amides, polyamides, poly(dioxepan-2-one), and polyphosphazenes. Combinations of these polymers and others can also be used in various embodiments. In various embodiments, homopolymers or copolymers of these various polymers can be used. Copolymers can include random, block, graft, and/or star copolymers in various embodiments.

In some embodiments, the degradable polymers can further comprise a plasticizer. Among other functions, the plasticizer can increase the tackiness of the degradable polymers, such that they become more capable of forming a degradable particulate seal. Suitable plasticizers that can be used in combination with degradable polymers according to the present embodiments can include, for example, polyethylene glycol, polyethylene oxide, oligomeric lactic acid, citrate esters (e.g., tributyl citrate oligomers, triethyl citrate, acetyltributyl citrate, and acetyltriethyl citrate), glucose monoesters, partial fatty acid esters, polyethylene glycol monolaurate, triacetin, poly($\epsilon$-caprolactone), poly(hydroxybutyrate), glycerin-1-benzoate-2,3-dilaurate, glycerin-2-benzoate-1,3-dilaurate, bis(butyl diethylene glycol)adipate, ethylphthalylethyl glycolate, glycerin diacetate monocaprylate, diacetyl monoacyl glycerol, polypropylene glycol and epoxy derivatives thereof, poly(propylene glycol)dibenzoate, dipropylene glycol dibenzoate, glycerol, ethyl phthalyl ethyl glycolate, poly(ethylene adipate)distearate, di-isobutyl adipate, and combinations thereof.

The degradation rate of a degradable polymer can depend at least in part on its backbone structure. The degradability of a degradable polymer can be due to a chemical change, for example, that destroys the polymer structure or that changes the solubility of the polymer such that it becomes more soluble than the parent polymer. For example, the presence of hydrolyzable and/or oxidizable linkages in the backbone can make a polymer degradable in one of the foregoing manners. The rates at which polymers degrade can be dependent on factors such as, for example, the repeat unit, composition, sequence, length, molecular geometry, molecular weight, morphology (e.g., crystallinity, particle size, and the like), hydrophilicity/hydrophobicity, and surface area. These factors can also influence the degradation rates of other types of degradable sealing particulates. As previously described, the presence of other additives can also be used to modify the degradation rate of degradable polymers. In addition, exposure to conditions such as for example, temperature, moisture, oxygen, microorganisms, enzymes, pH, and the like can alter the degradation rate. Knowing how the degradation rate is influenced by the polymer structure, one of ordinary skill in the art will be able to choose an appropriate degradable polymer such that its degradation rate is suitable for a given downhole transit time.

A dehydrated compound, particularly a dehydrated borate, can degrade over time as the dehydrated compound rehydrates and becomes soluble, thereby allowing a treatment fluid containing the dehydrated compound to become substantially particulate free over time. Illustrative dehydrated borates can include, for example, anhydrous sodium tetraborate (anhydrous borax) and anhydrous boric acid. These anhydrous borates and others are only slightly soluble in water. However, upon exposure to subterranean temperatures, they can slowly rehydrate over time and become considerably more soluble. As a result of the increased solubility, anhydrous borate particulates can degrade by becoming soluble. The time required for anhydrous borates to degrade by becoming soluble can range between about 8 hours and about 72 hours, depending upon the temperature of the subterranean zone in which they are placed. In some embodiments, dehydrated compounds can chemically decompose when rehydrated (e.g., by hydrolysis), such that the decomposition product becomes soluble.

Suitable oil-soluble materials can include natural or synthetic polymers, such as, for example, poly(butadiene), polyisoprene, polyacrylics, polyamides, polyether urethanes, polyester urethanes, and polyolefins (e.g., polyethylene, polypropylene, polyisobutylene, and polystyrene), and copolymers and blends thereof. In some embodiments, the oil-soluble materials can be degraded, for example, by formation fluids (e.g., oil) that are subsequently produced from the formation. In other embodiments, oil or a like hydrophobic material can be introduced into the subterranean formation in order to degrade the degradable sealing particulates and/or the degradable particulate seal.

Examples of suitable combinations of degradable substances can include, for example, poly(lactic acid)/sodium tetraborate, poly(lactic acid)/boric acid, poly(lactic acid)/calcium carbonate, poly(lactic acid)/magnesium oxide, polyacrylamide/polyvinyl alcohol and the like. In some embodiments, the combination of degradable substances can be chosen so that as one substance degrades, the remainder of the degradable sealing particulate disintegrates, such that the residue from the disintegrated particulate becomes soluble in the treatment fluid. In some embodiments, as one degradable substance degrades, the other substance can be exposed to a treatment fluid in which it natively dissolves. In some embodiments, as one degradable substance degrades, the other substance can be exposed to conditions in which it is chemically unstable and it subsequently degrades. In some embodiments, combinations of degradable substances can be intermixed with one another. In other embodiments, one degradable substance can be used to coat a second degradable substance.

In one embodiment, suitable degradable sealing particulates can be obtained in a BIOVERT™ additive slurry, which is commercially available from Halliburton Energy Services of Duncan, Okla. BIOVERT™ additive is a polymer material comprising about 90%-100% polylactide with a specific gravity of about 1.25. Polylactide can be degraded by exposure to a base or an acid. According to the present embodiments, a base can be added to a BIOVERT™ additive slurry in order to accelerate the degradation rate of the polylactide particulates therein but not the polylactide particulates deposited as a degradable particulate seal. Once deposited as a degradable particulate seal, the polylactide particulates can then be degraded by temperatures present in the formation. The foregoing implementation is contrary to the present use of BIOVERT™ additive where it is generally considered undesirable to accelerate the degradation rate of the polylactide particulates.

In one embodiment, suitable degradable sealing particulates can comprise a combination of a polyacrylamide or copolymer thereof and polyvinyl alcohol. Specifically, a crosslinked polyacrylamide gel can be combined with existing polyvinyl alcohol particulates in some embodiments. In such embodiments, the polyacrylamide can be degraded, optionally in the presence of a base (e.g., calcium carbonate), an oxidant and/or heat, and once the polyacrylamide is removed, the polyvinyl alcohol particulates can slowly become soluble in a treatment fluid at the formation temperature. Other suitable degradants for the polyacrylamide can include, for example, magnesium oxide and various oxidants. In some embodiments, the base used to degrade the polyacrylamide can arise from the subterranean formation (e.g., calcium carbonate from a shale formation). In some embodiments, calcium carbonate or a like base can be added to a treatment fluid containing the degradable sealing particulates. In some embodiments, calcium carbonate or a like base can be present as part of the degradable sealing particulates.

In some embodiments, the size distribution of the particulates can be used to further modulate the degradation rate of the degradable sealing particulates. For example, smaller particles can degrade more rapidly due to their larger surface area per unit mass.

In some embodiments, the degradable sealing particulates can be self-degrading. That is, the degradable sealing particulates can naturally degrade over time, particularly when exposed to a subterranean environment. In some embodiments, the degradation of self-degrading sealing particulates can be due to an inherent instability of the particulates or an instability in the presence of a component or condition (e.g., temperature) natively present in the subterranean formation. In some embodiments, a self-degrading particulate can be degradable by becoming slowly soluble in the treatment fluid, for example, by becoming hydrated or dehydrated or being changed in some physical manner (e.g., a change in particle size or particulate form that becomes more soluble). Again, particulate size and other morphological properties can be used to alter the degradation rate of self-degradable sealing particulates.

In some embodiments, the degradation rate of the degradable sealing particulates can be accelerated in the presence of an additive. In some embodiments, the additive can be present in the treatment fluid containing the degradable sealing particulates. In such embodiments, the additive can be present in the treatment fluid in a concentration at which the degradable sealing particulates in the treatment fluid are degraded faster than those within the degradable particulate seal. In alternative embodiments, the additive can be introduced into the subterranean formation after the degradable particulate seal has been formed. In still other embodiments, the additive can be present as part of the degradable sealing particulates. In some embodiments, the additive can be formulated so that a degrading component therein is released gradually into the treatment fluid over a period of time, such that a sufficient concentration for degrading the degradable sealing particulates therein is achieved. For example, an acid-generating compound such as an ester or orthoester can be present in a treatment fluid in which the degradable sealing particulates are initially stable, but which gradually becomes more and more detrimental for acid-degradable or acid-soluble compounds. In some embodiments, the additive can itself be formulated with a degradable coating, such that the degrading component therein is released into the treatment fluid over a period of time. It should also be further noted the additive in the treatment fluid can be added to reduce, rather than accelerate, the rate of degradation, if so desired for a given application. For example, the rate of degradation can be slowed by the additive in order to maintain the integrity of the degradable sealing particulates such that a degradable particulate seal has sufficient time to form.

Illustrative additives that can accelerate the degradation rate of the degradable sealing particulates can include substances such as, for example, acids, bases, oxidants, solvents, oil, chelating agents, enzymes, azo compounds, buffers, catalysts, solubility-enhancing compounds, surfactants, acid-generating compounds (e.g., esters and orthoesters), base-generating compounds, and any combination thereof. In some embodiments, polyhydroxylated compounds such as, for example, sorbitol, xylitol, and maltitol can be used as the additive to accelerate the degradation rate. Given the type of degradable sealing particulates used in a particular application, one of ordinary skill in the art will be able to pair an appropriate additive therewith to accelerate its degradation rate to a desired degree.

In some embodiments, an additive can also be used to accelerate the degradation rate of the degradable sealing particulates in the degradable particulate seal. In some embodiments, the additive used for accelerating the degradation rate of the degradable particulate seal can be the same quantity of additive added to degrade the degradable sealing particulates in the treatment fluid. That is, the additive in the treatment fluid can accelerate the degradation rate of the degradable sealing particulates in the degradable particulate seal, albeit it at a slower rate than the degradable sealing particulates in the treatment fluid. In some embodiments, a separate quantity of additive can be introduced to the subterranean formation in order to degrade the degradable sealing particulates in the degradable particulate seal. Generally, the additive used to accelerate the degradation of the degradable particulate seal is introduced after fracturing takes place, but it can also be introduced before the fracturing operation takes place or concurrently with a fracturing fluid, particularly if the additive only slow degrades the degradable particulate seal. For example, in an embodiment, the additive can be part of the degradable sealing particulates of the degradable particulate seal. When an additive is used to accelerate the degradation rate of the degradable particulate seal, the additive can be the same or different than the additive used to accelerate the degradation rate of the degradable sealing particulates in the treatment fluid. For example, a more aggressive additive may be required to degrade the degradable particulate seal due to a lower accessibility of the additive thereto.

In some embodiments, the additive included with or introduced to the treatment fluid to accelerate the degradation rate of the degradable sealing particulates can be present in at least a stoichiometric amount relative to the degradable sealing particulates introduced into the subterranean formation. The presence of at least a stoichiometric amount of the additive can ensure that all of the degradable sealing particulates are degraded before the fracturing operation is conducted. In alternative embodiments, the additive can be used in a sub-stoichiometric amount such that sufficient quantities are available to only partially degrade the degradable sealing particulates, with the remainder of the degradable sealing particulates being allowed to degrade through a native degradation pathway. Reasons one might employ a sub-stoichiometric amount of the additive can include, for example, if larger quantities of the additive undesirably affect the degradable sealing particulates in the degradable particulate seal or if larger quantities potentially might damage a subterranean formation.

In some embodiments, the treatment fluid can be used to initiate the fracturing operation after becoming substantially particulate free. For example, the treatment fluid can be pumped at a pressure that can create or enhance at least one fracture within the subterranean formation, where the pressure is maintained during the time that the degradable particulate seal forms and the degradable sealing particulates in the treatment fluid degrade. In other embodiments, once the treatment fluid has become substantially particulate free, a separate fracturing fluid can be introduced into the subterranean formation at a pressure sufficient to create or enhance at least one fracture therein. In such embodiments, the substantially particulate free treatment fluid can remain in the subterranean formation and serve as a "pad" fluid for introduction of the fracturing fluid. Alternately, in some embodiments, the substantially particulate free treatment fluid can be produced from the subterranean formation prior to introduction of the fracturing fluid. In some embodiments, the fracturing fluid can comprise a proppant so as to complete the fracturing operation. Suitable proppants will be well known to one having ordinary skill in the art.

The present methods can be particularly advantageous when used in subterranean formations in which the wellbore is lined with fracturing sleeves. Fracturing sleeves can be used to provide zonal isolation within a subterranean formation without using complicated zonal isolation techniques. Further, fracturing sleeves can be used as an alternative to cementing for well completion. A number of types of fracturing sleeves will be well known to one having ordinary skill in the art. One of ordinary skill in the art will also recognize the advantages of using fracturing sleeves in low permeability, consolidated formations such as, for example, tight sands and shales. As previously noted, fluid flow efficiency in the annulus defined by the fracturing sleeve and the surface of the subterranean formation can be poor, such that it can be difficult to perform subsequent fracturing operations due to the presence of particulates once the fracturing sleeves have all been opened and the subterranean formation is no longer in zonal isolation. In this regard, the present methods can address this difficulty in the art by allowing subsequent fracturing operations to take place in which the existing fractures within the completed wellbore are behind fracturing sleeves.

Figure 1B:
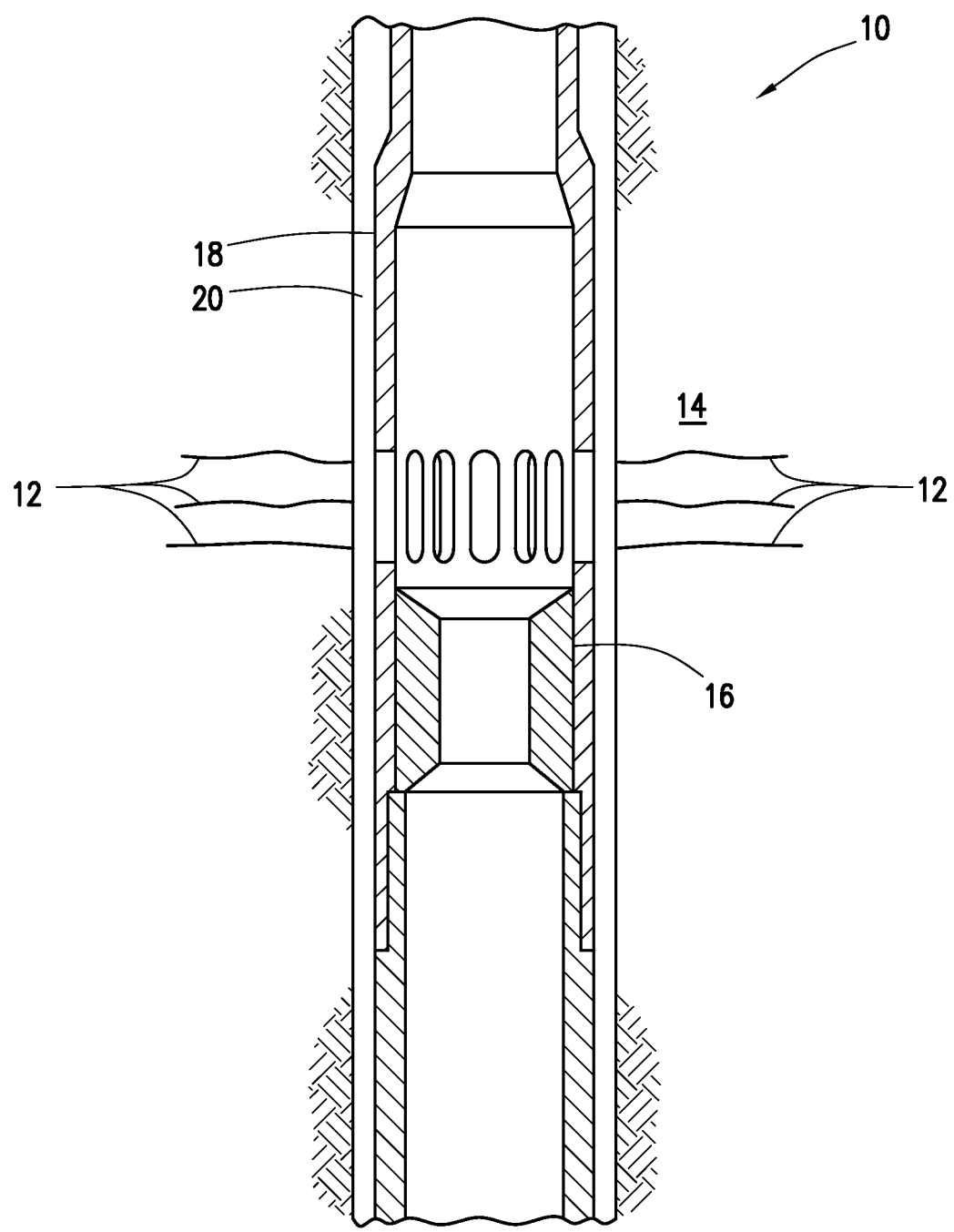

FIGS. 1A and 1B show illustrative schematics of completed wellbore 10 containing fractures 12 within subterranean formation 14, where fractures 12 are located behind fracturing sleeve 16. In FIG. 1A, fracturing sleeve 16 is closed, thereby maintaining a fracturing fluid within tubular 18. In FIG. 1B, fracturing sleeve 16 is in its open position, thereby allowing a fracturing fluid to flow from tubular 18 into annulus 20 and allowing one or more new fractures to be initiated.

The type of formation being treated by the present methods can generally vary without limitation. Shale formations, in particular, can present special technical challenges that can be readily addressed by the present methods, particularly when fracturing sleeves are present. Likewise, the wellbore orientation being treated according to the present embodiments can also generally vary without limitation. In some embodiments, the wellbore can be a vertical wellbore. In other embodiments, the wellbore can be a horizontal wellbore.

To facilitate a better understanding of the present invention, the following examples of preferred embodiments are given. In no way should the following examples be read to limit, or to define, the scope of the invention.

EXAMPLE

Example 1

Degradable Particulate Seals Comprising Anhydrous Sodium Tetraborate

Anhydrous sodium tetraborate is an example of a slowly soluble compound. As a control, a 1 gram sample was placed in 100 mL of water, and dissolution was allowed to take place. At room temperature, 72 hours was required for complete dissolution, and at 180° F., 48 hours was required for complete dissolution. When 1 mole of sorbitol per mole of sodium tetraborate was added to the water, complete dissolution occurred in only 2.25 hours at room temperature.

A slurry containing 350 mL of water, 0.7 grams xanthan, 7 g starch, 30 g anhydrous sodium tetraborate, and one molar equivalent of sorbitol per mole of sodium tetraborate was prepared. Once mixed, the fresh slurry was poured onto a 0.05" slotted disk fitted into a Fann HPHT Filtration Cell at room temperature. After 15 minutes, the test cell was closed, 200 psi of pressure was applied, and the bottom valve of the cell was opened to create the filter bed on the disk. After the filter bed had formed and fluid flow had ceased, the pressure was held for 8 hours, and the cell was then disassembled. Filtration of the remaining liquid above the filter bed indicated that it was substantially solids free at this time. This indicates that the filter bed degrades at a slower rate than that at which the slurry becomes solids free. The filter bed was capable of holding pressure for 48 hours at 200 psi.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   introducing a treatment fluid comprising a plurality of degradable sealing particulates into a completed wellbore penetrating a subterranean formation having an existing fracture therein;
   sealing the existing fracture with at least a portion of the degradable sealing particulates, thereby forming a degradable particulate seal;
   after sealing, allowing any degradable sealing particulates remaining in the treatment fluid to degrade, such that the treatment fluid becomes substantially particulate free; and
   after the treatment fluid becomes substantially particulate free, fracturing the subterranean formation so as to introduce at least one new fracture therein.

2. The method of claim 1, further comprising:
   after fracturing, allowing the degradable particulate seal to degrade.

3. The method of claim 2, further comprising:
   introducing an additive to the wellbore that accelerates the degradation rate of the degradable particulate seal.

4. The method of claim 1, wherein the treatment fluid further comprises an additive that accelerates the degradation rate of the degradable sealing particulates.

5. The method of claim 4, wherein the additive comprises at least one substance selected from the group consisting of an acid, a base, an oxidant, a solvent, oil, a chelating agent, an enzyme, an azo compound, a buffer, a catalyst, a solubility-enhancing compound, a surfactant, an acid-generating compound, and any combination thereof.

6. The method of claim 1, wherein the completed wellbore comprises an annulus defined by a fracturing sleeve and a surface in the subterranean formation.

7. The method of claim 1, wherein the degradable sealing particulates comprise at least one degradable substance selected from the group consisting of an organic salt, an inorganic salt, a polylactide, polylactic acid, a polyacrylamide, a polyacrylate, polyvinyl alcohol, a dehydrated borate, a poly(orthoester), an acid-soluble compound, a base-soluble compound, an oxidatively degraded compound, an enzymatically degraded compound, a degradable polymer, an oil-soluble compound, an oil-soluble polymer, a polyether, a polyester, a polyester amide, a polyether amide, a polyethylene oxide, a polyhydroxy alcohol, a polyamide, a polyacetal, a polyketone, a polycarbonate, a polyanhydride, a polyurethane, a polyester urethane, a polycarbonate urethane, a polycaprolactone urethane, a wax, a hydrogenated soybean oil, a polysilicone, a polysaccharide, xanthan, ethylcellulose, acetylated guar, methylcellulose, an acetylated polysaccharide, a propylated polysaccharide, a starch, a derivatized starch, a chitosan, chitin, and any combination thereof.

8. The method of claim 1, wherein the subterranean formation comprises a shale formation.

9. The method of claim 1, further comprising:
adding a fracturing fluid comprising a proppant into the completed wellbore to complete the fracturing.

10. The method of claim 1, further comprising:
producing a fluid from the subterranean formation.

11. A method comprising:
providing a treatment fluid comprising a plurality of degradable sealing particulates and an additive that accelerates the degradation rate of the degradable sealing particulates;
introducing the treatment fluid into a completed wellbore penetrating a subterranean formation having an existing fracture therein, such that the existing fracture is sealed with at least a portion of the degradable sealing particulates to form a degradable particulate seal;
allowing sufficient time to pass for any degradable sealing particulates remaining in the treatment fluid to degrade, such that the treatment fluid becomes substantially particulate free; and
after the treatment fluid becomes substantially particulate free, fracturing the subterranean formation so as to introduce at least one new fracture therein.

12. The method of claim 10, further comprising:
after fracturing, allowing the degradable particulate seal to degrade.

13. The method of claim 12, further comprising:
introducing an additive to the wellbore that accelerates the degradation rate of the degradable particulate seal.

14. The method of claim 10, wherein the additive comprises at least one substance selected from the group consisting of an acid, a base, an oxidant, a solvent, oil, a chelating agent, an enzyme, an azo compound, a buffer, a catalyst, a solubility-enhancing compound, a surfactant, an acid-generating compound, and any combination thereof.

15. The method of claim 10, wherein the completed wellbore comprises an annulus defined by a fracturing sleeve and a surface in the subterranean formation.

16. The method of claim 10, wherein the degradable sealing particulates comprise at least one degradable substance selected from the group consisting of an organic salt, an inorganic salt, a polylactide, polylactic acid, a polyacrylamide, a polyacrylate, polyvinyl alcohol, a dehydrated borate, a poly(orthoester), an acid-soluble compound, a base-soluble compound, an oxidatively degraded compound, an enzymatically degraded compound, a degradable polymer, an oil-soluble compound, an oil-soluble polymer, a polyether, a polyester, a polyester amide, a polyether amide, a polyethylene oxide, a polyhydroxy alcohol, a polyamide, a polyacetal, a polyketone, a polycarbonate, a polyanhydride, a polyurethane, a polyester urethane, a polycarbonate urethane, a polycaprolactone urethane, a wax, a hydrogenated soybean oil, a polysilicone, a polysaccharide, xanthan, ethylcellulose, acetylated guar, methylcellulose, an acetylated polysaccharide, a propylated polysaccharide, a starch, a derivatized starch, a chitosan, chitin, and any combination thereof.

17. The method of claim 10, wherein the subterranean formation comprises a shale formation.

18. A method comprising:
providing a treatment fluid comprising a plurality of degradable sealing particulates;
introducing the treatment fluid into a completed wellbore penetrating a subterranean formation having a first plurality of fractures therein, such that the first plurality of fractures are penetrated with at least a portion of the degradable sealing particulates to form a degradable particulate seal therein;
wherein the completed wellbore comprises an annulus defined by a fracturing sleeve and a surface of the subterranean formation;
allowing sufficient time to pass for any degradable sealing particulates remaining in the treatment fluid to degrade, such that the treatment fluid becomes substantially particulate free;
after the treatment fluid becomes substantially particulate free, fracturing the subterranean formation so as to introduce a second plurality of fractures therein; and
after fracturing, allowing the degradable particulate seal to degrade.

19. The method of claim 18, wherein the treatment fluid further comprises an additive that accelerates the degradation rate of the degradable sealing particulates.

20. The method of claim 18, further comprising:
after fracturing, introducing an additive to the wellbore that accelerates the degradation rate of the degradable particulate seal.

21. The method of claim 18, further comprising:
producing a fluid from the subterranean formation.

* * * * *